(12) United States Patent
Tsutsumi et al.

(10) Patent No.: US 8,968,062 B2
(45) Date of Patent: Mar. 3, 2015

(54) VEHICLE AIR CONDITIONER

(75) Inventors: Toshiaki Tsutsumi, Saitama (JP); Takayuki Arai, Saitama (JP); Masayuki Murase, Saitama (JP); Daisuke Araki, Saitama (JP)

(73) Assignee: Valeo Thermal Systems Japan Corporation, Saitama (JP)

( * ) Notice: Subject to any disclaimer, the term of this patent is extended or adjusted under 35 U.S.C. 154(b) by 788 days.

(21) Appl. No.: 13/061,864

(22) PCT Filed: Aug. 24, 2009

(86) PCT No.: PCT/JP2009/064706
§ 371 (c)(1),
(2), (4) Date: Mar. 2, 2011

(87) PCT Pub. No.: WO2010/026885
PCT Pub. Date: Mar. 11, 2010

(65) Prior Publication Data
US 2011/0171897 A1    Jul. 14, 2011

(30) Foreign Application Priority Data
Sep. 2, 2008  (JP) .................... 2008-225302

(51) Int. Cl.
*B60H 1/24*   (2006.01)
*B60H 1/00*   (2006.01)

(52) U.S. Cl.
CPC ........ *B60H 1/00849* (2013.01); *B60H 1/00671* (2013.01); *B60H 2001/00085* (2013.01); *B60H 2001/00614* (2013.01); *B60H 2001/00721* (2013.01)
USPC ............................................. 454/141; 454/69

(58) Field of Classification Search
CPC ........... B60H 1/00671; B60H 1/00849; B60H 2001/00085; B60H 2001/00614; B60H 2001/00721
USPC ............ 454/69–165, 184; 236/49.3; 137/605
See application file for complete search history.

(56) References Cited

U.S. PATENT DOCUMENTS

| 4,616,693 A | 10/1986 | Dietzsch et al. |
| 6,926,601 B2 * | 8/2005 | Aoki et al. ................. 454/121 |
| 6,988,670 B2 * | 1/2006 | Keen et al. ................. 236/49.3 |

FOREIGN PATENT DOCUMENTS

| JP | 56-147114 A | 11/1981 |
| JP | 59-199315 A | 11/1984 |

(Continued)

OTHER PUBLICATIONS

English language abstract for JP 62-241720 extracted from the PAJ database on Sep. 25, 2013, 5 pages.

(Continued)

*Primary Examiner* — Steven B McAllister
*Assistant Examiner* — Ko-Wei Lin
(74) *Attorney, Agent, or Firm* — Howard & Howard Attorneys PLLC

(57) ABSTRACT

A vehicle air conditioner provided with an airflow structure for an intake box, wherein, in an HVAC comprising, in an intake box, a control device for controlling the number of rotation, the control device is reliably cooled by airflow regardless of the ratio of mixing between internal air and external air. A vehicle air conditioner of center-concentrated type, wherein a control device (6) for controlling the number of rotation is mounted to a vehicle interior-side wall surface inside an intake box (2) and wherein an air delivery guide (22) is provided in the intake box (2), the air delivery guide (22) delivering to the control device (6) a part of air introduced from a direction crossing the direction of opening of a suction opening (7) of a blower (8).

5 Claims, 9 Drawing Sheets

(56) References Cited

FOREIGN PATENT DOCUMENTS

| JP | 62-241720 | A |   | 10/1987 |          |
|----|-----------|---|---|---------|----------|
| JP | 01-168514 | A |   | 7/1989  |          |
| JP | 10-217747 | A |   | 8/1998  |          |
| JP | 2002-362130 | A |   | 12/2002 |        |
| JP | 2002362130 | A | * | 12/2002 | ............... B60H 1/00 |
| JP | 2004-262299 | A |   | 9/2004  |        |

OTHER PUBLICATIONS

English language abstract and machine-assisted English translation for JP 2004-262299 extracted from the PAJ database on Sep. 25, 2013, 22 pages.

English language abstract for JP 56-147114, provided for by client, 12 pages.

English language abstract for JP 59-199315 extracted from PAJ database, Jan. 27, 2011, 5 pages.

English language abstract for JP 01-168514 extracted from PAJ database, Jan. 27, 2011, 5 pages.

English language translation and abstract for JP 10-217747 extracted from PAJ database, Feb. 8, 2011, 20 pages.

English language translation and abstract for JP 2002-362130 extracted from PAJ database, Feb. 8, 2011, 28 pages.

PCT International Search Report for PCT/JP2009/064706, dated Sep. 15, 2009, 4 pages.

\* cited by examiner

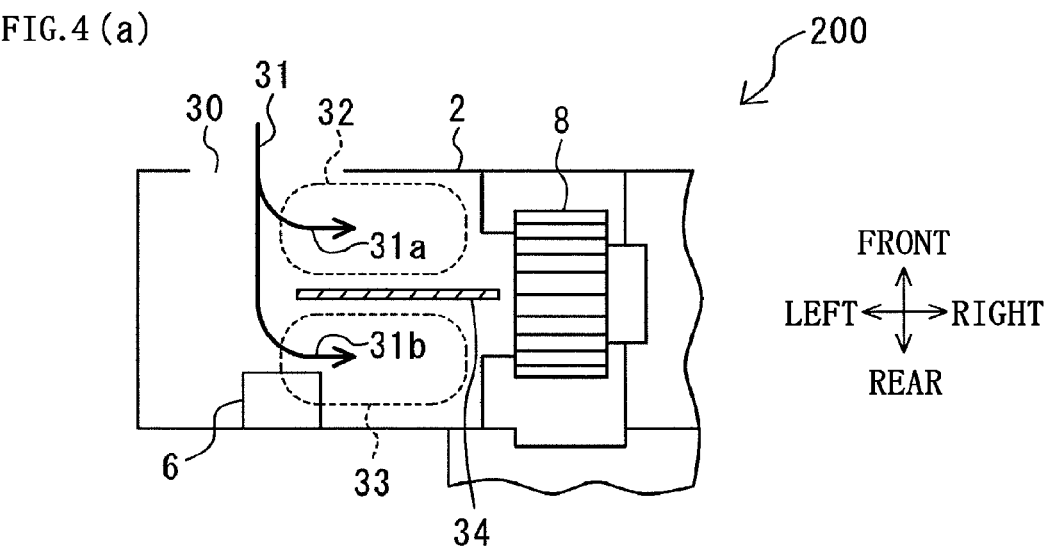
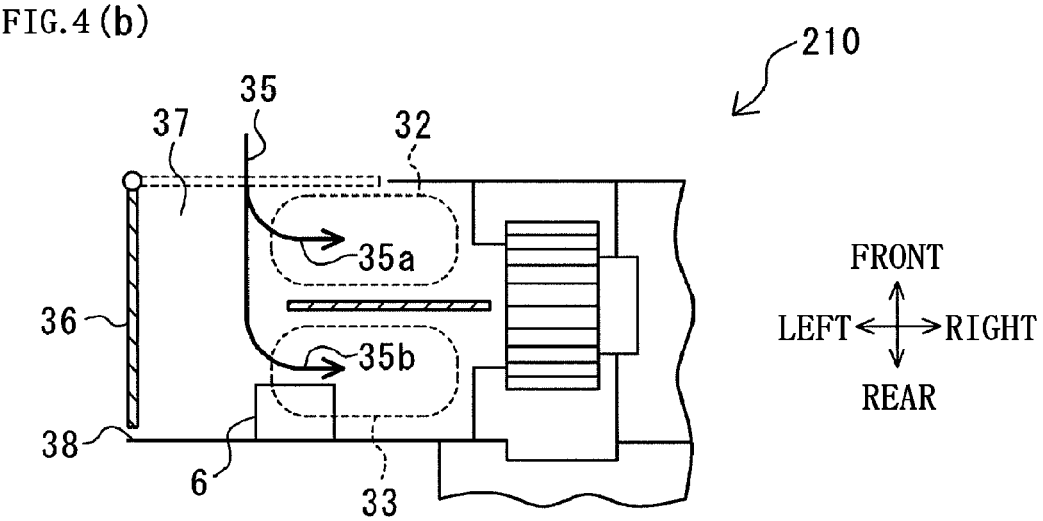

VEHICLE AIR CONDITIONER

RELATED APPLICATIONS

This application claims priority to and all the advantages of International Patent Application No. PCT/JP2009/064706, filed on Aug. 24, 2009, which claims priority to Japanese Patent Application No. JP2008-225302, filed on Sep. 2, 2008.

TECHNICAL FIELD

The present invention relates to a structure of an intake box of a vehicle air conditioner and more specifically relates to a ventilation structure to a rotation controlling device (resistor, power transistor) for controlling a rotational number of a blower provided in the intake box.

BACKGROUND ART

An HVAC of the vehicle air conditioner is provided with a rotational number controlling device for controlling the rotational number of the blower to adjust a volume of blown air. When controlling the rotational number of the blower by using the rotational number controlling device, since the rotational number controlling device generates heat, a heat radiating unit of the rotational number controlling device (hereinafter, that including the heat radiating unit is simply represented as the rotational number controlling device in the present invention) is installed in an airflow passage of a case of the air conditioner to be cooled by the blown air. A structure of a general HVAC is such that the blower and a unit provided with a heat exchanger are separated from each other and the rotational number controlling device is installed in a duct provided therebetween (refer to FIG. 1 of the Patent Document 1, for example).

There is the HVAC having a structure referred to as a center concentrated-type so as to meet with requirement of downsizing in addition to a separate-type HVAC disclosed in the Patent Document 1. In the center concentrated-type HVAC, components such as an intake box, a blower, a cooling heat exchanger, a heating heat exchanger, a temperature adjusting door and an air delivery door to compose the same are assembled in the vicinity of a vehicle center, thereby making an occupied volume in a vehicle front-rear and right-left direction small (refer to, for example, FIG. 1 of the Patent Document 2; however, an installation position is not specifically disclosed).

In the center concentrated-type HVAC, a duct for connecting the blower and the unit provided with the heat exchanger does not exist or small even if this exists, and the unit itself is required to make an occupied area thereof smaller, so that density of various parts arranged inside is high and it is difficult to secure an installation position of the rotational number controlling device. Therefore, there is an example of installing the rotational number controlling device in the intake box in a center concentrated-type air conditioner (refer to, for example, FIGS. 7 and 8 of the Patent Document 2).

PRIOR ART DOCUMENTS

Patent Documents

Patent Document 1: Japanese Patent Application Laid-Open No. 10-217747
Patent Document 2: Japanese Patent Application Laid-Open No. 2002-362130

DISCLOSURE OF INVENTION

Problems to be Solved by the Invention

The intake box is provided with a function to appropriately control a mixture ratio of internal air and external air of a vehicle in air to be supplied to the blower. An external air introducing opening and an internal air introducing opening are provided on the case of the intake box and internal/external air switching means is provided in the case for appropriately controlling the mixture ratio by appropriately moving the internal/external air switching means. Therefore, when installing the rotational number controlling device in the intake box, it is required to configure an airflow passage such that the rotational number controlling device is certainly cooled regardless of a selected mixture ratio.

The rotational number controlling device is installed on a portion, which faces to a vehicle interior, of the air conditioner such that attachment of vehicle electric wiring and exchange at failure may be performed. When the rotational number controlling device is installed in the intake box, this is installed not on a vehicle front side but on a vehicle interior side wall surface.

On the other hand, in the center concentrated-type air conditioner, a suction direction of the blower is in a vehicle right-left direction. In this manner, air blown from the blower is in a vehicle up-down direction or in a vehicle front-rear direction and the occupied area in the vehicle right-left direction may be made small.

At least the external air out of air introduced into the intake box is introduced from the vehicle front side and an airflow is bent so as to be along the suction direction of the blower to reach a suction opening. When the internal/external air switching means selects an external air introducing mode, airflow resistance is smaller in a vehicle front side passage (passage closer to the external air introducing opening) than in a vehicle interior side passage (passage farther from the external air introducing opening) in the intake box, so that a sufficient airflow is not secured in the vehicle interior side passage. However, the rotational number controlling device is installed in the vehicle interior side passage for the above-described reason. In this manner, there is a problem that the rotational number controlling device is not sufficiently cooled in the configuration of the air conditioner in which the airflow introduced from the vehicle front side is bent so as to be along the suction direction of the blower.

Further, there is also a configuration in which not only the external air but also the internal air is introduced from the vehicle front side for a reason of a layout of the vehicle (for example, a configuration in the Patent Document 2). In this case, there is a problem that the rotational number controlling device is not sufficiently cooled regardless of an external air introducing mode and the internal air circulation mode selected by the internal/external air switching means.

Therefore, an object of the present invention is to provide the vehicle air conditioner provided with the ventilation structure of the intake box in which the rotational number controlling device is certainly cooled by the airflow regardless of the selected mixture ratio of the internal air and the external air in the HVAC provided with the rotational number controlling device in the intake box.

Means for Solving the Problems

The inventors of the present invention find that the above-described problem may be solved by attaching the rotational number controlling device to the vehicle interior side wall surface in the intake box and providing the air delivery guide to deliver apart of the airflow to the rotational number controlling device and accomplish the present invention. That is, a vehicle air conditioner according to the present invention includes at least: an intake box including an external air introducing opening, an internal air introducing opening and internal/external air switching means for controlling a mixture ratio of internal air and external air; a blower arranged downstream of the intake box for forming an airflow in a case; and a rotational number controlling device for controlling a rotational number of the blower, the vehicle air conditioner with an opening direction of a suction opening of the blower directed in a vehicle right-left direction and with an opening direction of the external air introducing opening directed in a direction intersecting with the opening direction of the suction opening of the blower, wherein the rotational number controlling device is attached to a vehicle interior side wall surface in the intake box, and an air delivery guide for delivering a part of air introduced from the direction intersecting with the opening direction of the suction opening of the blower to the rotational number controlling device is provided in the intake box (First aspect).

In the vehicle air conditioner according to the present invention, further, the internal air introducing opening is provided on the extension of the opening direction of the suction opening of the blower, the air delivery guide is provided on the internal/external air switching means, and the air delivery guide is formed to have a shape along an airflow introduced into the intake box when an internal air circulation mode is selected by the internal/external air switching means (Second aspect). Since the internal air introducing opening is provided on the extension of the opening direction of the suction opening of the blower, a sufficient amount of air may pass through a vehicle side passage in the intake box in the internal air circulation mode. Also, since the air delivery guide is provided on the internal/external air switching means, a part of the external air introduced into the intake box may be delivered to the rotational number controlling device in the external air introducing mode. Therefore, the rotational number controlling device may be certainly cooled regardless of the mixture ratio of the internal air and external air selected by the internal/external air switching means in the configuration in which the internal air introducing opening is provided on the extension of the opening direction of the suction opening of the blower. Also, since the air delivery guide is formed to have the shape along the airflow to be introduced into the intake box when the internal air circulation mode is selected, the air delivery guide does not disturb the airflow of the internal air in the internal air circulation mode, so that the airflow of the internal air, which flows in a linear manner, efficiently cools the rotational number controlling device. Also, air blowing efficiency of the blower in the internal air circulation is not deteriorated.

In the vehicle air conditioner according to the present invention, further, the air delivery guide is located on a position, which is not brought into contact with the airflow flowing in the intake box, when the internal air circulation mode is selected by the internal/external air switching means (Third aspect). When the internal air circulation mode is selected, the air delivery guide is located outside a system of the airflow in the intake box, so that the air delivery guide does not become the airflow resistance at all.

Effects of Invention

According to the present invention, in the HVAC provided with the rotational number controlling device in the intake box, the rotational number controlling device is certainly cooled by the airflow regardless of the selected mixture ratio of the internal/external air.

BRIEF DESCRIPTION OF DRAWINGS

FIG. 4 is a plane view for illustrating the inner structure in the intake box of a comparative example in which the air delivery guide is not provided in which (a) illustrates an example in which the internal air and the external air are introduced from a direction intersecting with an opening direction of a suction opening of a blower and (b) illustrates an example in which the internal/external air switching means is a cantilever door and the external air is introduced from the direction intersecting with the opening direction of the suction opening of the blower.

BEST MODE FOR CARRYING OUT THE INVENTION

An embodiment of the present invention is hereinafter described in detail with reference to the drawings. The present invention is not limited to the embodiment described hereinafter. Meanwhile, the same reference sign is assigned to the same member and the same part. Various modifications in mode may be made as long as an effect of the present invention may be obtained.

Figure 1A:
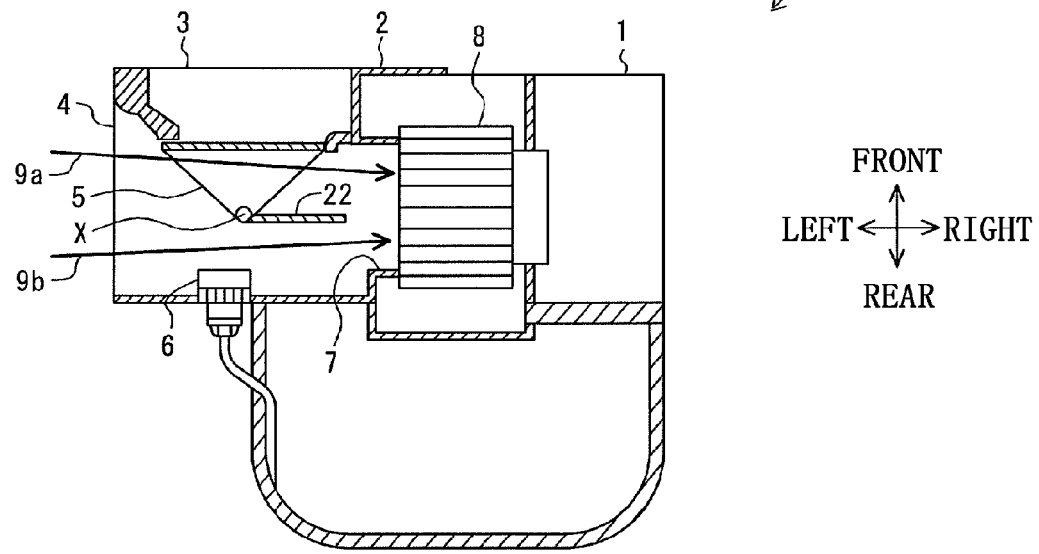
FIG. 1 is a plane view for illustrating an inner structure of an intake box of a first embodiment of a vehicle air conditioner in which (a) illustrates an internal air circulation mode and (b) illustrates an external air introducing mode.
Figure 5A:
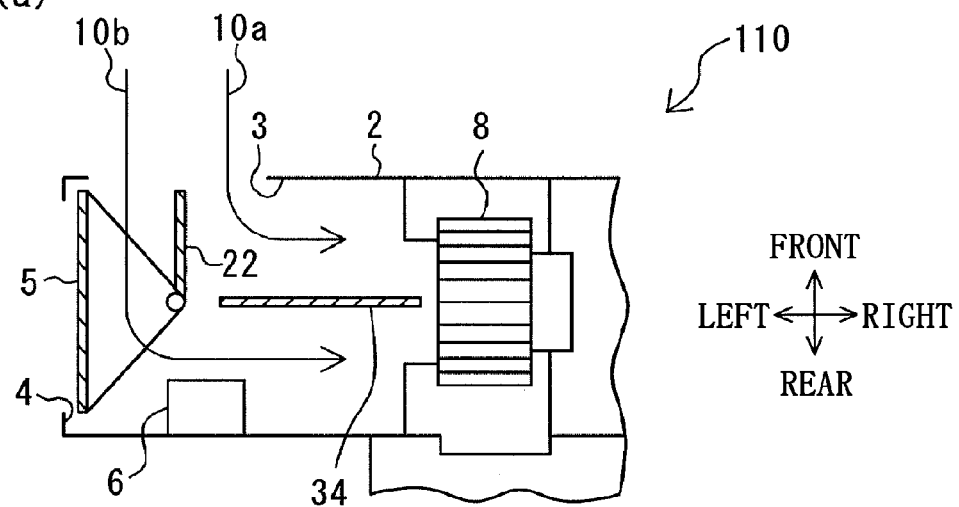
FIG. 5 is a plane view for illustrating the inner structure in the intake box for illustrating a modified example of the first embodiment of the vehicle air conditioner further provided with a partition wall in which (a) illustrates the external air introducing mode and (b) illustrates the internal air circulation mode.
Figure 5B:
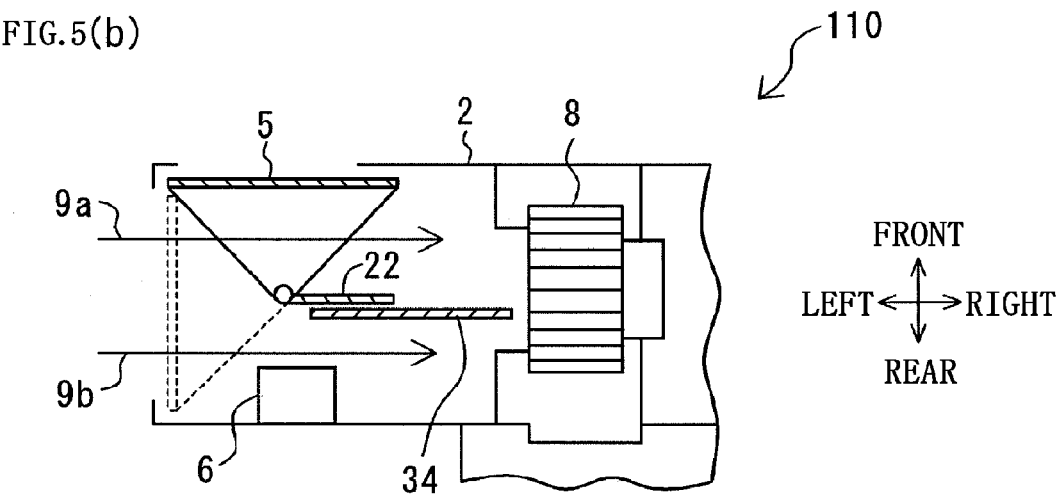
Figure 6A:
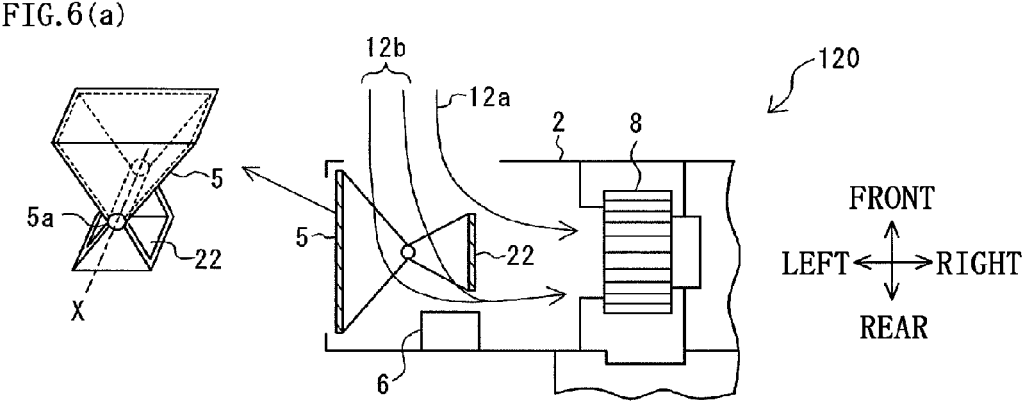
FIG. 6 is a plane view for illustrating the inner structure in the intake box for illustrating a modified example of the first embodiment of the vehicle air conditioner in which the air delivery guide is separated from a rotating shaft of the internal/external air switching means in which (a) illustrates the external air introducing mode and (b) illustrates the internal air circulation mode.
Figure 6B:
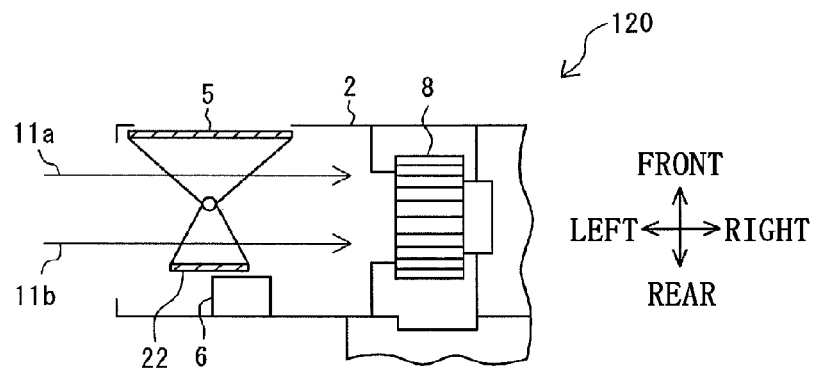

A vehicle air conditioner of a first embodiment is described with reference to FIGS. 1 to 6. FIG. 1 is a plane view for illustrating an inner structure of an intake box of the first embodiment of the vehicle air conditioner in which (a) illustrates an internal air circulation mode and (b) illustrates an external air introducing mode. FIG. 2 is a schematic cross-sectional view in which the air conditioner and a part of a vehicle are illustrated for illustrating a structure of the intake box of the first embodiment of the vehicle air conditioner. FIG. 3 is a perspective view for illustrating a structure of internal/external air switching means provided with an air delivery guide in the vehicle air conditioner of the first embodiment. FIG. 4 is a plane view for illustrating the inner structure of the intake box of a comparative example, which is not provided with the air delivery guide, in which (a) illustrates an example in which internal air and external air are introduced from a direction intersecting with an opening direction of a suction opening of a blower and (b) illustrates an example in which the internal/external air switching means is a cantilever door and the external air is introduced from the direction intersecting with the opening direction of the suction opening of the blower. FIG. 5 is a modified example of the first embodiment of the vehicle air conditioner in which a partition wall is further provided and is a plane view for illustrating the inner structure of the intake box in which (a) illustrates the external air introducing mode and (b) illustrates the internal air circulation mode. FIG. 6 illustrates a modified example of the first embodiment of the vehicle air conditioner in which the air delivery guide provided on a rotary door is separated from a rotating shaft of the internal/external air switching means in which (a) illustrates the external air introducing mode and (b) illustrates the internal air circulation mode.

Figure 1B:
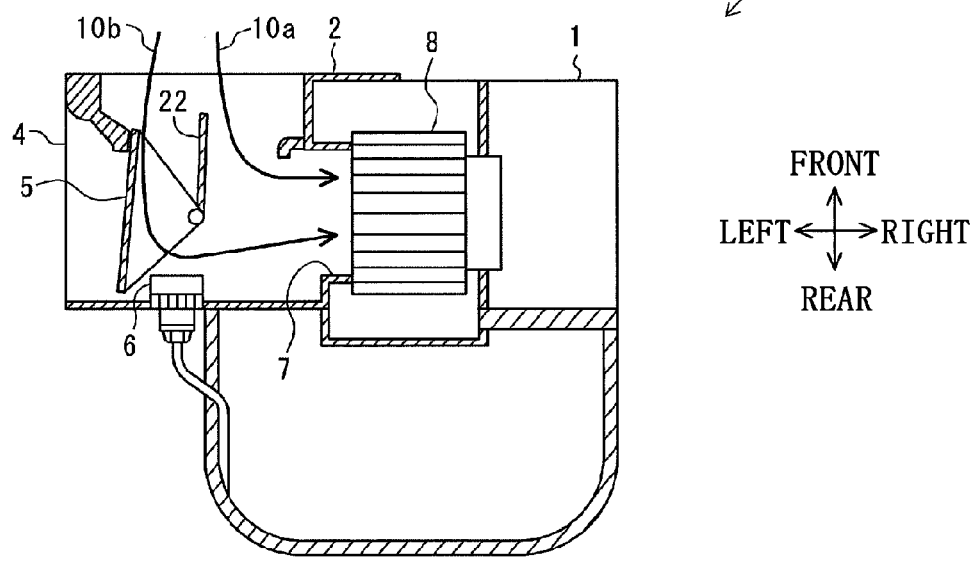
Figure 2:
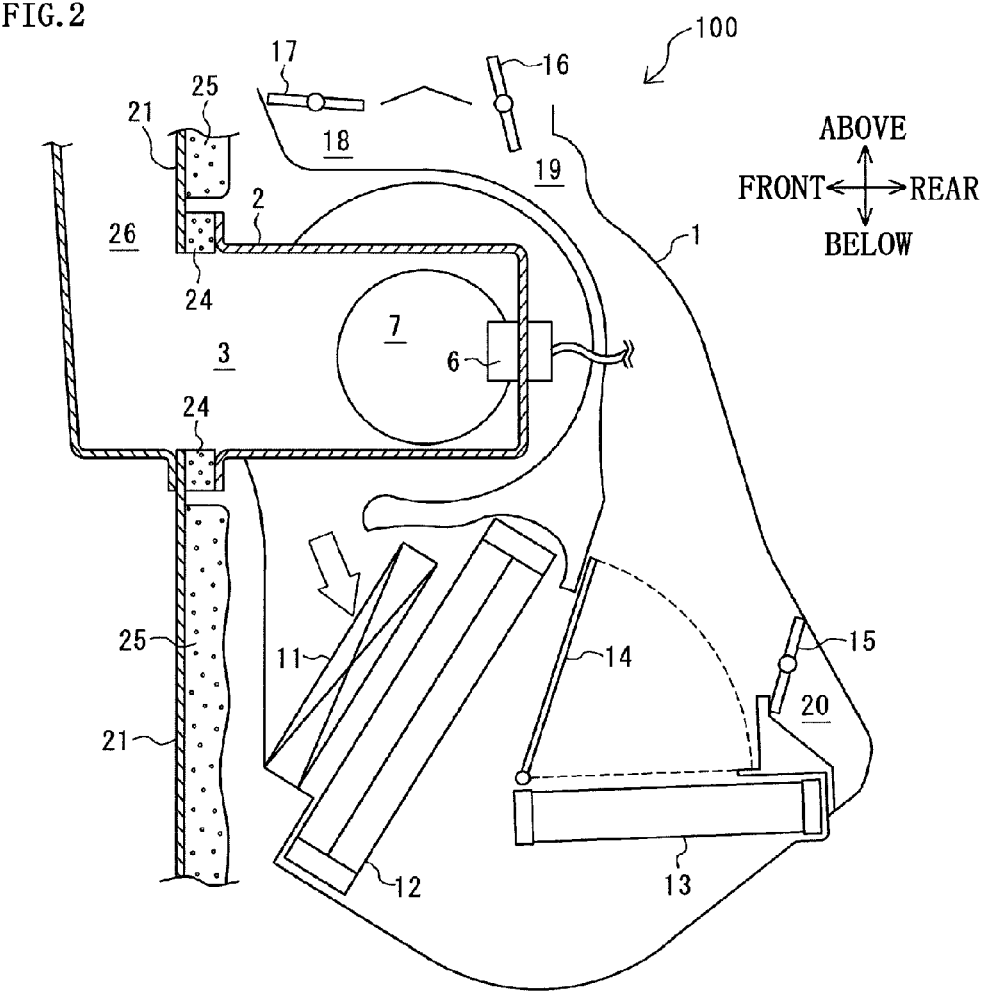
FIG. 2 is a schematic cross-sectional view in which an air conditioner and a part of a vehicle are illustrated for illustrating a structure of the intake box of the first embodiment of the vehicle air conditioner.
Figure 3:
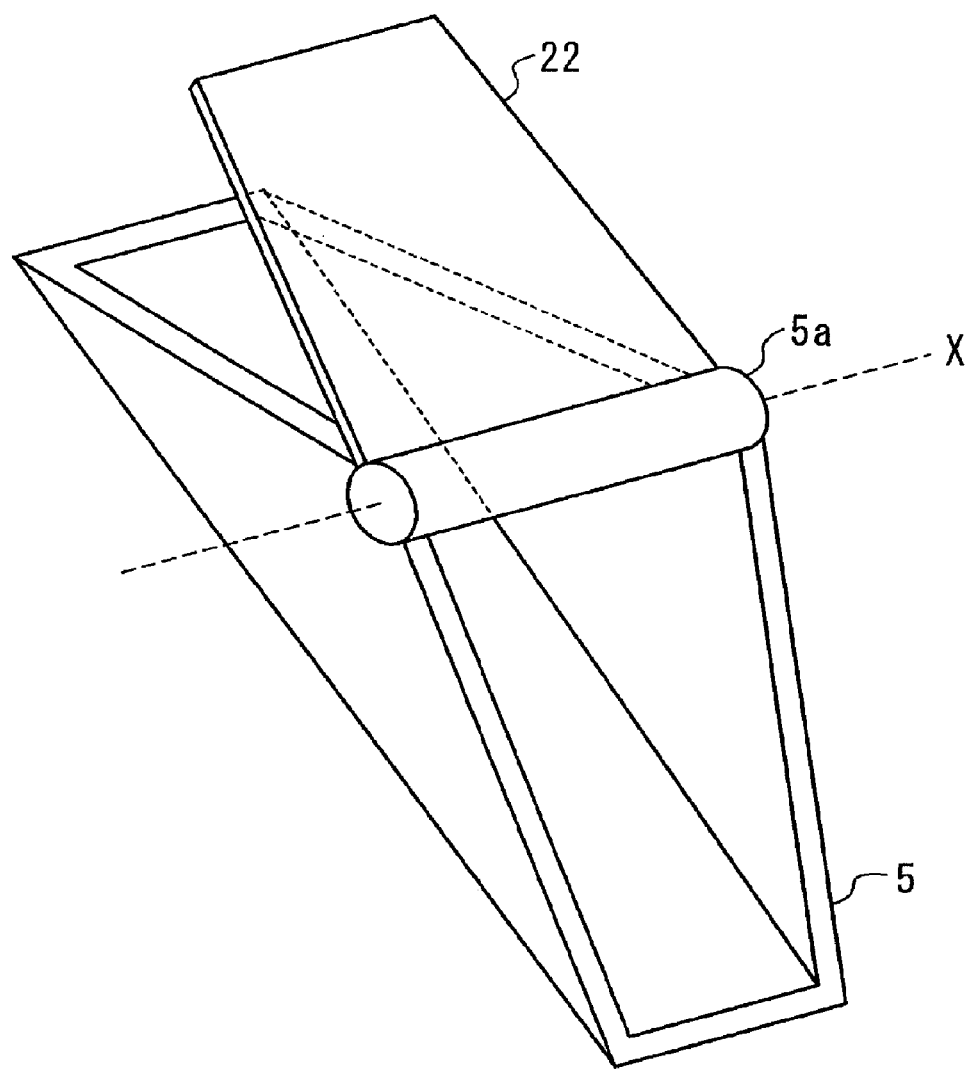
FIG. 3 is a perspective view for illustrating a structure of internal/external air switching means provided with an air delivery guide in the vehicle air conditioner of the first embodiment.

As illustrated in FIGS. 1 to 3, a vehicle air conditioner 100 according to the first embodiment is a center concentrated-type air conditioner provided at least with an intake box 2 including an external air introducing opening 3, an internal air introducing opening 4 and internal/external air switching means 5 for controlling a mixture ratio of the internal air and the external air, a blower 8 arranged downstream of the intake box 2 for forming an airflow in a case 1 and a rotational number controlling device 6 for controlling a rotational number of the blower 8 in which an opening direction of a suction opening 7 of the blower 8 is directed in a vehicle right-left direction and an opening direction of the external air introducing opening 3 is directed in a direction intersecting with the opening direction of the suction opening 7 of the blower 8. The rotational number controlling device 6 is attached to a vehicle interior side wall surface in the intake box 2 and an air delivery guide 22 for delivering a part 10b of air introduced from the direction intersecting with the opening direction of the suction opening 7 of the blower 8 to the rotational number controlling device 6 is provided in the intake box 2, as illustrated in FIG. 1(b).

The external air introducing opening 3 is directed to a vehicle front side and communicates with an external air introduction passage 26 provided on a fireboard 21, as illustrated in FIG. 2.

The internal air introducing opening 4 is provided on any site of the intake box 2. As illustrated in FIG. 1(a), a mode in which the internal air introducing opening 4 is provided on the extension of the opening direction of the suction opening 7 of the blower 8 is preferable. In the internal air circulation mode, the airflow in the intake box 2 flows in a linear manner and airflow resistance does not decrease. Meanwhile, as illustrated in FIG. 4(a), when the external air introducing opening, the internal air introducing opening and the internal/external air switching means (none of them is illustrated) are provided on an outer side of an opening 30 of the intake box 2, the airflows of the internal air and the external air are introduced from the direction intersecting with the opening direction of the suction opening of the blower 8, and a mode in which the airflow of the internal air is in the direction intersecting with the opening direction of the suction opening of the blower 8 in this manner is also included in the embodiment of the present invention.

Although a centrifugal sirocco fan is illustrated as the blower 8, this may be a turbo fan, and further, this may be a cross flow fan.

The rotational number controlling device 6 for controlling the rotational number of the blower 8 is attached to the vehicle interior side wall surface in the intake box 2 ("rear" side in the drawing), as illustrated in FIG. 1(a), for example. When this is attached to a vehicle front side wall surface in the intake box 2, there is a problem that it is difficult to extract wiring or exchange in case of trouble and there is no allowance in space due to presence of the fireboard 21 in FIG. 2. Also, when this is attached to an upper side wall surface or a lower side wall surface of the vehicle, this is brought into contact with the internal/external air switching means 5 and there is no allowance in installation space. When the rotational number controlling device 6 is attached to the vehicle interior side wall surface, there is an advantage that there is allowance in installation space and extraction of the wiring and maintenance are easy.

The opening direction of the suction opening 7 of the blower 8 is directed in the vehicle right-left direction in a case of the center concentrated-type air conditioner. In this manner, a direction of air blown from the blower is in a vehicle up-down direction or a vehicle front-rear direction, so that an occupied area of the air conditioner in the vehicle right-left direction may be made small. Meanwhile, the air blown from the blower is preferably directed in the vehicle up-down direction, as illustrated in FIG. 2. In this manner, the occupied area of the air conditioner in the vehicle front-rear direction may be made small. According to this, the external air introducing opening 3 is directed to the external air introduction passage 26, which passes through the fireboard 21 in FIG. 2, so that the opening direction of the external air introducing opening 3 is directed in the direction intersecting with the opening direction of the suction opening 7 of the blower 8, as illustrated in FIG. 1.

As the internal/external air switching means 5, there are three types, which are the rotary door, a butterfly door or the cantilever door, or a modified type thereof, and any type may be used in the present invention. The rotary door is the door in which a rotating shaft and a sheet surface for opening and closing are separated from each other. The butterfly door is the door in which a plurality of sheet surfaces for opening and closing are provided on a rotating shaft. The cantilever door is the door in which one sheet surface for opening and closing is provided on a rotating shaft. Also, the internal/external air switching means 5 includes, in addition to the one composed of one member for optionally changing an opening area ratio of the internal air introducing opening and the external air introducing opening (for example, a single-piece door), the one obtained by combining a plurality of members each for changing the opening area ratio of the internal air introducing opening and the external air introducing opening (for example, a dedicated door for opening and closing the internal air introducing opening and a dedicated door for opening and closing the external air introducing opening).

The vehicle air conditioner 100 according to the first embodiment adopts the rotary door. As illustrated in FIG. 3, this rotates about an X axis around a rotating shaft 5a and may take the internal air circulation mode illustrated in FIG. 1(a) or the external air introducing mode illustrated in FIG. 1(b) or an intermediate state of them. That is to say, the mixture ratio of the internal air and the external air may be changed by controlling a rotational state around the rotating shaft 5*a*. Meanwhile, the rotary door is rotated by a motor and controlling means thereof (both are not illustrated).

The air delivery guide serves to adjust the direction of the airflow in the intake box 2 and this may be provided on any position as long as this is provided in the intake box 2, however, this is preferably provided on the internal/external air switching means 5, as illustrated in FIG. 3, for example, in a viewpoint that a space is secured and that unique operating means and controlling means are not necessary. As illustrated in FIG. 3, a blade-shaped air delivery guide 22 is fixed to the rotating shaft 5*a* of the rotary door. A direction of the air delivery guide 22 may be changed in association with rotation about the X axis of the rotating shaft 5*a* of the rotary door. Meanwhile, a mode when providing the air delivery guide on the internal/external air switching means may be any of a mode in which the internal/external air switching means and the air delivery guide are integrally formed of plastic resin and a mode in which the air delivery guide is joined to the internal/external air switching means by fixing means such as bonding and fitting.

The airflow is specifically described with reference to FIG. 1. First, the internal air introducing opening 4 is provided on the extension of the opening direction of the suction opening 7 of the blower 8. FIG. 1(*a*) illustrates the internal air circulation mode in which the external air introducing opening 3 is blocked and the internal air introducing opening 4 is opened by the rotary door 5. The air delivery guide 22 fixed to the internal/external air switching means (rotary door) 5 has a shape along airflows 9*a* and 9*b* of the internal air introduced into the intake box 2, that is to say, the shape in which a direction of the airflows 9*a* and 9*b* and a longitudinal direction of the blade-shaped air delivery guide 22 conform to each other. The blade shape is, for example, a flat plate shape. At that time, the air delivery guide 22 does not disturb the airflows 9*a* and 9*b* of the internal air and this does not become the airflow resistance, so that the airflow 9*b* of the internal air, which flows in a linear manner, efficiently cools the rotational number controlling device 6. Next, FIG. 1(*b*) illustrates the external air introducing mode in which the internal air introducing opening 4 is blocked and the external air introducing opening 3 is opened by the rotary door 5. The air delivery guide 22 fixed to the internal/external air switching means 5 has a shape along airflows 10*a* and 10*b* of the external air introduced into the intake box 2, that is to say, the shape in which a direction of the airflows 10*a* and 10*b* and the longitudinal direction of the blade-shaped air delivery guide 22 conform to each other. At that time, a part 10*b* of the external air introduced into the intake box may be efficiently delivered to the rotational number controlling device 6 to cool the same by the air delivery guide 22.

When the air delivery guide is not provided as vehicle air conditioners 200 and 210 illustrated in FIG. 4, since the airflow resistance is smaller in a vehicle front side passage (passage closer to the external air introducing opening) 32 than that in a vehicle interior side passage (passage farther from the external air introducing opening) 33 in the intake box 2, a sufficient airflow is not secured in the vehicle interior side passage 33. That is to say, an airflow 31*b* is weaker than an airflow 31*a*. At that time, the rotational number controlling device 6 installed in the vehicle interior side passage 33 is not sufficiently cooled by the airflow 31*b*. Although the vehicle air conditioners 200 and 210 are provided with a partition wall 34 such that the airflow reaches the rotational number controlling device 6, thereby adjusting the airflow sucked into the blower 8, it is not sufficient. On the other hand, the vehicle air conditioner 100 according to the first embodiment is provided with the air delivery guide 22, so that the airflow 10*b* is sufficiently secured. Meanwhile, in the vehicle air conditioner 200 in FIG. 4(*a*), the rotational number controlling device 6 is not sufficiently cooled in both of the internal air circulation mode and the external air introducing mode. In the vehicle air conditioner 210 in FIG. 4(*b*), the rotational number controlling device 6 is sufficiently cooled in the internal air circulation mode, however, the rotational number controlling device 6 is not sufficiently cooled in the external air introducing mode.

A vehicle air conditioner 110 illustrated in FIG. 5 is a modified example of the vehicle air conditioner according to the first embodiment provided with the partition wall 34 for adjusting the airflow, which flows into the intake box. In a case of the external air introducing mode (FIG. 5(*a*)), the air delivery guide 22 and the partition wall 34 are directed in directions intersecting with each other to form a substantially elbow-shaped flow passage. According to this, the airflows 10*a* and 10*b* become the airflows substantially divided in half and the airflow 10*b* is certainly blown to the rotational number controlling device 6. Also, in a case of the internal air circulation mode (FIG. 5(*b*)), the air delivery guide 22 and the partition wall 34 are arranged longitudinally on the substantially same plane. According to this, the airflows 9*a* and 9*b* become the airflows substantially divided in half and the airflow 9*b* is certainly blown to the rotational number controlling device 6. At that time, the air delivery guide 22 and the partition wall 34 serve to adjust the flows for the airflows 9*a* and 9*b*, however, they form a flat plate shape even when being combined, so that they do not become the airflow resistance.

A vehicle air conditioner 120 illustrated in FIG. 6 is a modified example of the vehicle air conditioner according to the first embodiment in which the air delivery guide 22 is located away from the rotating shaft 5*a* of the internal/external air switching means 5. In a case of the external air introducing mode (FIG. 6(*a*)), the air delivery guide 22 has a shape along airflows 12*a* and 12*b* of the external air introduced into the intake box 2. At that time, a part 12*b* of the external air introduced into the intake box may be efficiently delivered to the rotational number controlling device 6 to cool the same by the air delivery guide 22. Also, in a case of the internal air circulation mode (FIG. 6(*b*)), the air delivery guide 22 is located on a position along the airflows 11*a* and 11*b*, so that this does not become the airflow resistance.

Figure 7A:
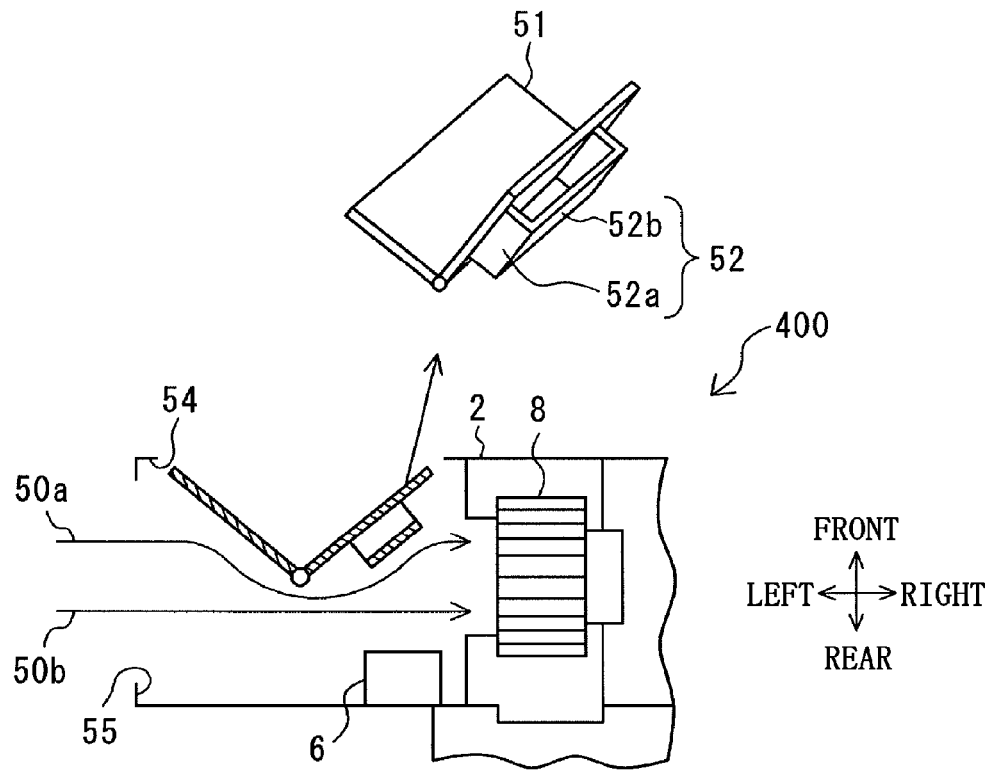
FIG. 7 is a plane view for illustrating the inner structure of the intake box of a second embodiment of the vehicle air conditioner in which (a) illustrates the internal air circulation mode and (b) illustrates the external air introducing mode.
Figure 7B:
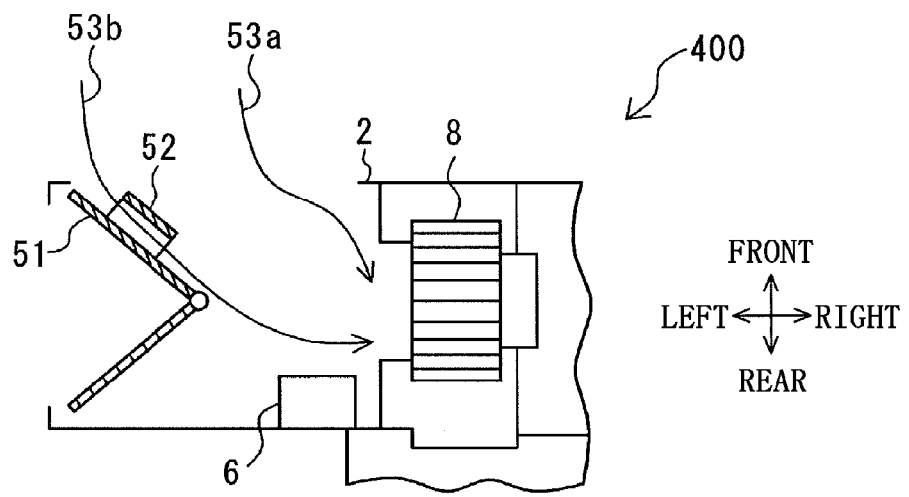

The vehicle air conditioner according to a second embodiment is described with reference to FIG. 7. FIG. 7 is a plane view for illustrating the inner structure of the intake box of the second embodiment of the vehicle air conditioner in which (a) illustrates the internal air circulation mode and (b) illustrates the external air introducing mode. A V-shaped butterfly door 51 is adopted as the internal/external air switching means.

The V-shaped butterfly door 51 is provided with two sheets, which form a V shape around a rotating shaft. An air delivery guide 52 is fixed to a surface on an outer side of the V shape of a sheet closer to the blower 8. The air delivery guide 52 is composed of a guide surface 52*b* and a guide side portion 52*a* for keeping a distance between the guide surface and the sheet of the V-shaped butterfly door 51. Although the guide side portion 52*a* has a sheet shape in FIG. 7, this may have another shape such as a columnar shape as long as it is possible to fix the guide surface 52*b* to the sheet of the V-shaped butterfly door 51.

The airflow is specifically described with reference to FIG. 7. First, an internal air introducing opening 55 is provided on the extension of the opening direction of the suction opening of the blower 8. FIG. 7(*a*) illustrates the internal air circulation mode in which an external air introducing opening 54 is blocked and the internal air introducing opening 55 is opened by the V-shaped butterfly door 51. The air delivery guide 52 fixed to the V-shaped butterfly door 51 is located away from airflows 50*a* and 50*b* of the internal air introduced into the intake box 2. That is to say, the air delivery guide 52 is located above a rotating shaft of the V-shaped butterfly door 51 based on the drawing in FIG. 7(*a*), and the airflow 50*a* is changed obliquely downward by the sheet of the V-shaped butterfly door 51 before the rotating shaft, so that the air delivery guide 52 does not substantially affect the airflow 50*a*. A part of the airflow 50*a* of which direction is changed by the sheet of the V-shaped butterfly door 51 cools the rotational number controlling device 6. On the other hand, the airflow 50*b* of the internal air, which flows in a linear manner, efficiently cools the rotational number controlling device 6. Next, FIG. 7(*b*) illustrates the external air introducing mode in which the internal air introducing opening 55 is blocked and the external air introducing opening 54 is opened by the V-shaped butterfly door 51. The air delivery guide 52 adjusts a flow such that a part (corresponding to an airflow 53*b*) of airflows 53*a* and 53*b* of the external air introduced into the intake box 2 is directed to the rotational number controlling device 6. At that time, a part 53*b* of the external air introduced into the intake box may be efficiently delivered to the rotational number controlling device 6 to cool the same by the air delivery guide 52.

Figure 8A:
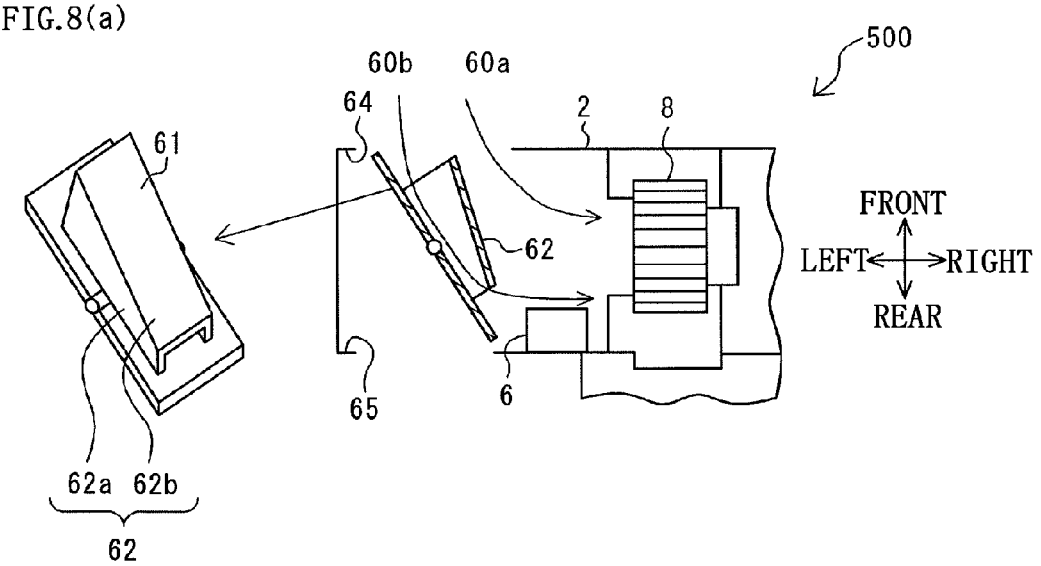
FIG. 8 is a plane view for illustrating the inner structure of the intake box of a third embodiment of the vehicle air conditioner in which (a) illustrates the external air introducing mode and (b) illustrates the internal air circulation mode.
Figure 8B:
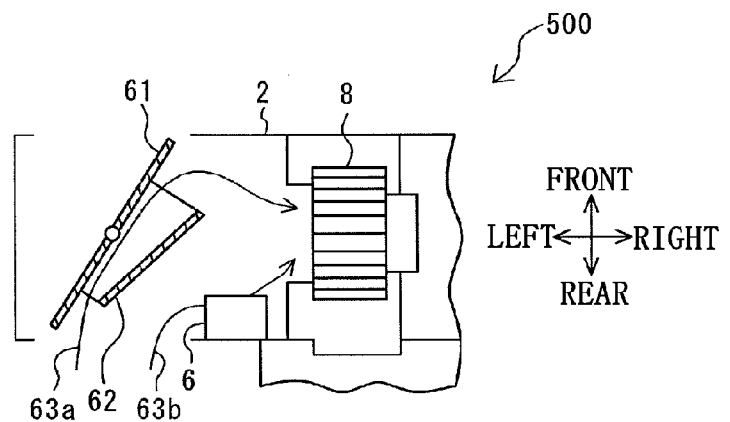

The vehicle air conditioner of a third embodiment is described with reference to FIG. 8. FIG. 8 is a plane view for illustrating the inner structure of the intake box of the third embodiment of the vehicle air conditioner in which (a) illustrates the external air introducing mode and (b) illustrates the internal air circulation mode. A 180° butterfly door 61 is adopted as the internal/external air switching means.

The 180° butterfly door 61 is provided with two sheets with an angle of 180° therebetween around a rotating shaft. An air delivery guide 62 is fixed across the two sheets. The air delivery guide 62 is composed of a guide surface 62*b* and a guide side portion 62*a* for keeping a distance between the guide surface and the sheet of the 180° butterfly door 61. Although the guide side portion 62*a* has a sheet shape in FIG. 8, this may have another shape such as the columnar shape as long as it is possible to fix the guide surface 62*b* to the sheet of the 180° butterfly door 61. Meanwhile, although the guide surface may be parallel to the 180° butterfly door, the guide surface 62*b* is preferably inclined such that a suction opening of the air delivery guide becomes larger upstream of the airflow, as illustrated in FIG. 8.

The airflow is specifically described with reference to FIG. 8. The third embodiment is a specific example of a mode in which the internal air introducing opening 55 is not provided on the extension of the opening direction of the suction opening of the blower 8 and the airflow of the internal air is in the direction intersecting with the opening direction of the suction opening of the blower 8. FIG. 8(*a*) illustrates the external air introducing mode in which an internal air introducing opening 65 is blocked and an external air introducing opening 64 is opened by the 180° butterfly door 61. The air delivery guide 62 adjusts a flow such that a part (corresponding to an airflow 60*b*) of airflows 60*a* and 60*b* of the external air introduced into the intake box 2 is directed to the rotational number controlling device 6. At that time, a part 60*b* of the external air introduced into the intake box 2 may be efficiently delivered to the rotational number controlling device 6 to cool the same by the air delivery guide 62. On the other hand, FIG. 8(*b*) illustrates the internal air circulation mode in which the external air introducing opening 64 is blocked and the internal air introducing opening 65 is opened by the 180° butterfly door 61. The internal air introducing opening 65 is opened to a vehicle interior side and an airflow, which flows to the blower 8, is such that 63*b*, which flows on the vehicle interior side, flows easier than an airflow 63*a*, which flows on a vehicle front side. Therefore, sufficient air flows to the rotational number controlling device 6 attached on the vehicle interior side of the intake box 2 to cool the same.

Figure 9A:
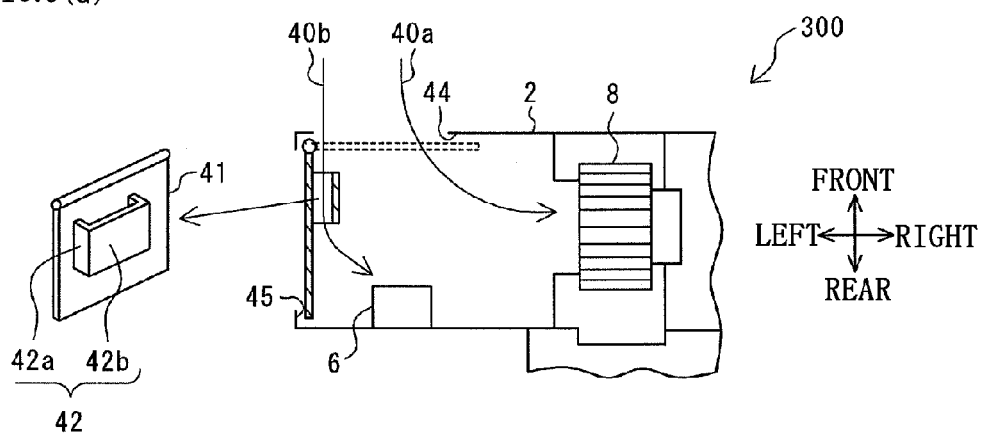
FIG. 9 is a plane view for illustrating the inner structure of the intake box of a fourth embodiment of the vehicle air conditioner in which (a) illustrates the external air introducing mode and (b) illustrates the internal air circulation mode.
Figure 9B:
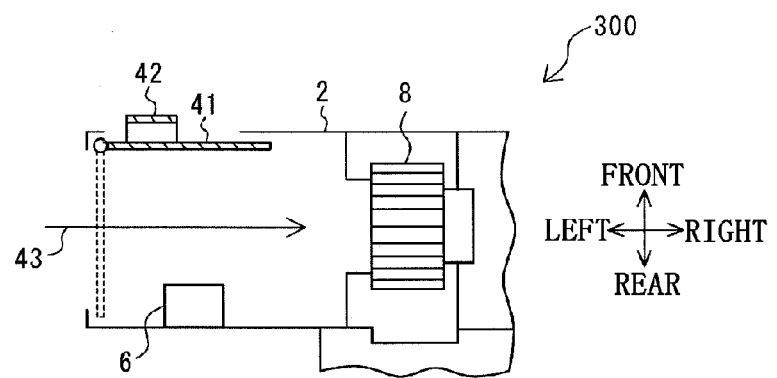

The vehicle air conditioner of a fourth embodiment is described with reference to FIG. 9. FIG. 9 is a plane view for illustrating the inner structure of the intake box of the fourth embodiment of the vehicle air conditioner in which (a) illustrates the external air introducing mode and (b) illustrates the internal air circulation mode. A cantilever door 41 is adopted as the internal/external air switching means.

The cantilever door 41 is provided with one sheet on a rotating shaft thereof. An air delivery guide 42 is fixed to a surface of the sheet closer to the blower 8. The air delivery guide 42 is composed of a guide surface 42*b* and a guide side portion 42*a* for keeping a distance between the guide surface and the sheet of the cantilever door 41. Although the guide side portion 42*a* has a sheet shape in FIG. 9, this may have another shape such as the columnar shape as long as it is possible to fix the guide surface 42*b* to the sheet of the cantilever door 41.

The airflow is specifically described with reference to FIG. 9. In the fourth embodiment, an internal air introducing opening 45 is provided on the extension of the opening direction of the suction opening of the blower 8. FIG. 9(*a*) illustrates the external air introducing mode in which the internal air introducing opening 45 is blocked and an external air introducing opening 44 is opened by the cantilever door 41. As illustrated in FIG. 4, an airflow 40*b* tends to be weaker than 40*a* and the airflow 40*b* is not sufficiently delivered to the rotational number controlling device 6. Then, the air delivery guide 42 adjusts a flow such that a part (corresponding to the airflow 40*b*) of the airflows 40*a* and 40*b* of the external air introduced into the intake box 2 is delivered to the rotational number controlling device 6. At that time, a part 40*b* of the external air introduced into the intake box 2 may be efficiently delivered to the rotational number controlling device 6 to cool the same by the air delivery guide 42. On the other hand, FIG. 9(*b*) illustrates the internal air circulation mode in which the external air introducing opening 44 is blocked and the internal air introducing opening 45 is opened by the cantilever door 41. The air delivery guide 42 fixed to the cantilever door 41 is located on a site, which is not brought into contact with the airflow 43 flowing in the intake box 2, when the internal air circulation mode is selected. In this manner, the air delivery guide 42 is located outside a system of the airflow 43 in the intake box 2, so that the air delivery guide 42 does not become the airflow resistance at all.

The airflow sucked by the blower 8 passes through a filter 11, a cooling heat exchanger 12 and a heating heat exchanger 13 as illustrated in FIG. 2 in all of the first to fourth embodiments. A temperature is controlled by an air mix door 14 as necessary. Then, by switching a foot door 15 for controlling the airflow resistance of a passage, which leads to a foot blower, a vent door 16 for controlling the airflow resistance of a passage, which leads to a vent blower, and a defrost door 17 for controlling the airflow resistance of a passage, which leads to a defrost blower, the airflow is delivered in the vehicle interior from each of the vent blower, the defrost blower and the foot blower. Also, although not illustrated in FIG. 2, there is a case in which a door for controlling a passage, which leads to aside vent, a rear vent, a rear foot and the like, and the airflow resistance is further provided.

EXPLANATION OF REFERENCE NUMERALS 1 case
2 intake box
3, 44, 54, 64 external air introducing opening
4, 45, 55, 65 internal air introducing opening
5 internal/external air switching means
5a rotating shaft
6 rotational number controlling device
7 suction opening
8 blower
9a, 9b, 10a, 10b, 11a, 11b, 12a, 12b, 31a, 31b, 35a, 35b, 40a, 40b, 50a, 50b, 53a, 53b, 60a, 60b, 63a, 63b airflow
11 filter
12 cooling heat exchanger
13 heating heat exchanger
14 air mix door
15 foot door
16 vent door
17 defrost door
18 defrost
19 vent
21 fireboard
22, 42, 52, 62 air delivery guide
24 seal material
25 fireboard upper heat insulator
26 external air introduction passage
30 opening of intake box
32 vehicle front side passage
33 vehicle interior side passage
34 partition wall
42a, 52a, 62a guide side portion
42b, 52b, 62b guide surface
41 cantilever door
51 V-shaped butterfly door
61 180° butterfly door
100, 110, 200, 210, 300, 400, 500 vehicle air conditioner

The invention claimed is:

1. A vehicle air conditioner, comprising at least:
an intake box including an external air introducing opening, an internal air introducing opening and an internal air and external air switching door to control a mixture ratio of internal air and external air;
a blower arranged downstream of the intake box for forming an airflow in a case; and
a rotational number controlling device for controlling a rotational number of the blower,
the vehicle air conditioner with an opening direction of a suction opening of the blower directed in a vehicle right-left direction and with a normal direction to a plane of the external air introducing opening directed in a direction intersecting with a normal direction to a plane of the suction opening of the blower, wherein
the rotational number controlling device is attached to a vehicle interior side wall surface in the intake box, and an air delivery guide for delivering a part of air introduced from the external air introducing opening to the rotational number controlling device is provided in the intake box, and wherein
the internal air introducing opening is provided on the extension of the opening direction of the suction opening of the blower, the air delivery guide is provided on the internal air and external air switching door, and the air delivery guide is formed to have a shape along an airflow introduced into the intake box when an internal air circulation mode is selected by the internal air and external air switching door.

2. The vehicle air conditioner according to claim 1, wherein the air delivery guide is located on a position, which is not brought into contact with the airflow flowing in the intake box, when the internal air circulation mode is selected by the internal air and external air switching door.

3. The vehicle air conditioner according to claim 1, wherein the internal air and external air switching door is selected from a rotary door, a butterfly door, or a cantilever door.

4. The vehicle air conditioner according to claim 1, wherein the internal air and external air switching door is a rotary door, and the shape of the air delivery guide is a flat plate shape.

5. The vehicle air conditioner according to claim 1, wherein the normal direction to the plane of the external air introducing opening is perpendicular to the normal direction to the plane of the suction opening of the blower.

* * * * *